United States Patent [19]

Nakamoto et al.

[11] 3,856,643

[45] Dec. 24, 1974

[54] PHOTOCURABLE COMPOSITIONS CONTAINING POLYVALENT METAL SALTS OF UNSATURATED MONO OR DICARBOXYLIC ACIDS

[75] Inventors: Hideo Nakamoto; Juichi Kobayashi; Takashi Kobayashi, all of Nagoya, Japan

[73] Assignee: Mitsubishi Rayon Company, Ltd., Tokyo, Japan

[22] Filed: Sept. 18, 1973

[21] Appl. No.: 398,337

[30] Foreign Application Priority Data

Sept. 19, 1972    Japan................................ 47-93210

[52] U.S. Cl............ 204/159.15, 117/38, 117/93.31, 117/132 BE, 117/138.3 UA, 117/148, 117/161 ZB, 204/159.16, 204/159.18, 204/159.19, 204/159.23, 204/159.24, 260/2.5 AM, 260/2.5 BE, 260/2.5 EP, 260/2.5 N, 260/2.5 R, 260/18 TN, 260/22 LB, 260/22 TN, 260/23 TN, 260/23 EP, 260/23 AR, 260/42.21, 260/42.28, 260/42.52, 260/75 NK, 260/77.5 AP, 260/77.5 CR, 260/830 P, 260/836, 260/837 R, 260/861, 260/864, 260/865, 260/866

[51] Int. Cl............................. B01j 1/10, B01j 1/12

[58] Field of Search..... 204/159.15, 159.16, 159.19, 204/159.23, 159.24; 260/836, 837 R

[56] References Cited

UNITED STATES PATENTS

| | | | |
|---|---|---|---|
| 3,712,871 | 1/1973 | Pasternach..................... | 204/159.19 |
| 3,713,864 | 1/1973 | Ackerman et al............. | 204/159.19 |
| 3,772,171 | 11/1973 | Savageau et al.............. | 204/159.19 |
| 3,781,214 | 12/1973 | Nemoto et al................ | 204/159.19 |

*Primary Examiner*—Paul Lieberman
*Assistant Examiner*—Richard B. Turer
*Attorney, Agent, or Firm*—Oblon, Fisher, Spivak, McClelland & Maier

[57] ABSTRACT

A resinous composition, which is curable by photo-irradiation even in the presence of oxygen, is prepared from (A) 2 to 60% by weight of a divalent or trivalent metal salt of an unsaturated mono- or di-carboxylic acid, (B) 98 to 40% by weight of unsaturated compound having from 0.5 to 12 polymerizable unsaturated bonds per unit molecular weight of 1000 and (C) photosensitizers. This composition is suitable for uses such as coating materials or ink binders and can produce tack free coated films. The films obtained after curing this composition are excellent in adhesive property as well as in other chemical and mechanical properties.

7 Claims, No Drawings

PHOTOCURABLE COMPOSITIONS CONTAINING POLYVALENT METAL SALTS OF UNSATURATED MONO OR DICARBOXYLIC ACIDS

BACKGROUND OF THE INVENTION

1. Field of the Invention

This invention relates to a resinous composition which can exhibit an excellent curing property even when it is subjected to photo-irradiation in the presence of oxygen, and is particularly useful for paints or ink binders.

2. Description of the Prior Art

Heretofore, several resinous compositions which can be cured by photo-irradiation are known. Namely, monomers, oligomers or pre-polymers having polymerizable unsaturation, which are used alone or suitably combined are admixed with photo-polymerization catalysts. These resinous compositions can advantageously be used because they contain no conventional organic solvent, e.g. toluene, xylene, butanol, etc., which is liable to be dissipated into the air to cause air pollution as well or which might have the effect of adversely affecting the working environment. However, when these resinous compositions are coated onto substrates and irradiated by light to form cured films thereon in the presence of oxygen, polymerization of the coated layers is inhibited by the effect of oxygen. As the result of insufficient curing, no tack free coated film can be formed. In order to overcome this drawback, it is proposed to conduct the coating operations under an atmosphere of an inert gas such as nitrogen or carbonic acid gas. This method, however, is difficult in maintaining the atmosphere free from oxygen and moreover is very expensive.

SUMMARY OF THE INVENTION

An object of the present invention is to provide a coating composition which is not influenced by polymerization inhibiting effect of oxygen when it is subjected to photo-irradiation in the presence of oxygen.

Another object of the present invention is to provide a coating composition which, in addition to the above property, can impart excellent properties to the cured film formed such as good adhesive property on the substrate, good flexibility as well as high impact strength.

It is also another object of the present invention to provide a coating method which can be practiced easily and economically in industrial applications.

Further object of the present invention is to provide a composition which can be suitably used as an ink binder.

The other objects of the present invention will become apparent in the further detailed description as set forth below.

In order to accomplish these objects of the present invention, the present invention provides a resinous composition curable by photo-irradiation which comprises:

A. At least one divalent or trivalent metal salt of unsaturated mono- or di-carboxylic acids selected from the group consisting of (I) 

wherein R and $R_1$ are hydrogen or methyl; X is a divalent or trivalent metal atom and n is an integer of 2 or 3, (II) 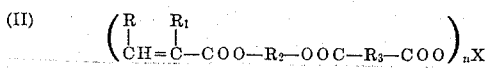

wherein R and $R_1$ are defined as above, $R_2$ is an alkylene group having 2 to 10 carbon atoms, polyethylene glycol residual group or polypropylene glycol residual group, and $R_3$ is

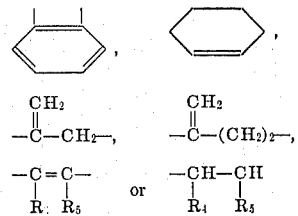

wherein $R_4$ and $R_5$ represent hydrogen or alkyl having 1 to 4 carbon atoms, and X and n are as defined above; and (III) 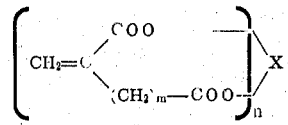

wherein m is an integer of 2 or 3 and X and n are as defined above,

B. At least one unsaturated compound having 0.5 to 12 polymerizable unsaturated bonds per unit molecular weight of 1000, being selected from the group consisting of 1. A divinyl reaction product of a polyepoxy having an epoxy equivalent of 100 to 2000, and an unsaturated monocarboxylic acid, in a ratio of one epoxy group per one carboxylic acid group,
2. A tetra or hexa vinyl ester condensate reaction product of said divinyl product (1) above, and a diisocyanate in a ratio of 2:1 to 3:2,
3. An unsaturated resin reaction product of dicarboxylic acid and glycidyl acrylate or methacrylate in a molar ratio of 1:2,
4. Reaction product of (3) above with a diisocyanate in a ratio of 2:1 to 3:2,
5. Di-, -tri, or tetra-vinyl condensation reaction product of a polyol and an unsaturated carboxylic acid and a halide thereof in an equivalent ratio, and C. At least one photosensitizer wherein the quantity of (A) and (B) is from 2 to 60% by weight and from 98 to 40% by weight, respectively, based on the total weight of (A) and (B), and wherein the photosensitizer is used in an amount of 0.1 to 15% by weight, based on the weight of the resinous composition.

DETAILED DESCRIPTION OF THE PREFERRED EMBODIMENTS

The unsaturated mono- or di-carboxylic acids which may be used to prepare the divalent or trivalent salt thereof in practicing the present invention may include acrylic acid, methacrylic acid, crotonic acid, maleic acid, itaconic acid, and α-methylene glutaric acid. They may also include the synthesized unsaturated carboxylic acids represented by the following formulas:

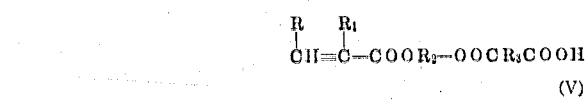

(V)

wherein R and $R_1$ represent hydrogen atom or methyl group, $R_2$ an alkylene group having carbon atoms from 2 to 10, $R_3$ a group selected from the group consisting of

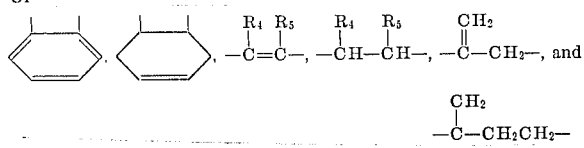

(wherein $R_4$ and $R_5$ represent hydrogen atom or an alkyl group having carbon atoms from 1 to 4). They may further include such unsaturated fatty acids as linoleic acid, linolenic acid, oleic acid, eraidic acid, undecylenic acid and the like. The particularly preferred carboxylic acids in order to accomplish the objects of the present invention are acrylic acid, methacrylic acid, itaconic acid, methylene glutaric acid, crotonic acid and the carboxylic acids represented by the formula (V). The carboxylic acids represented by the formula (V) may be obtained by the addition reaction of hydroxy acrylates, methacrylates or crotonates, including 2-hydroxyethyl acrylate (or methacrylate), 3-hydroxypropyl acrylate (or methacrylate), 2-hydroxypropyl acrylate (or methacrylate), 4-hydroxybutyl acrylate (or methacrylate), 6-hydroxyhexyl acrylate (or methacrylate) and 2-hydroxyethyl crotonate, or polyethylene glycol mono acrylate (or methacrylate) or mono crotonate, or polypropylene glycol mono acrylate (or methacrylate) or mono crotonate with carboxylic acid anhydrides such as fumaric acid anhydride, maleic acid anhydride, methyl maleic acid anhydride, itaconic acid anhydride, α-methylene gultaric acid anhydride, phthalic acid anhydride, tetrahydro phthalic acid anhydride, succinic acid anhydride, methyl succinic acid anhydride, and the like.

As the divalent or trivalent metals to be used for preparation of the metal salt (A) as mentioned above, such metals as zinc, magnesium, calcium, strontium, barium, cadmium, mercury, cupric copper, aluminum, ferrous iron, ferric iron, cobalt, and nickel may be used. In the present invention, aluminum, zinc, calcium, magnesium, barium and strontium are particularly preferred.

The polyvalent metal salts of the unsaturated carboxylic acids as mentioned above may be prepared by allowing the aforesaid unsaturated carboxylic acids to react with the hydroxides of the aforesaid metals in suitable solvents such as alcohols.

Thus, the polyvalent salts of mono- or di-carboxylic acids represented by the following formulas may be prepared:

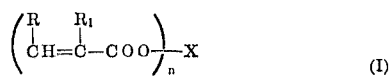 (I)

wherein R and $R_1$ is hydrogen atom or methyl group, X is a di- or trivalent metal atom and n is an integer of 2 or 3;

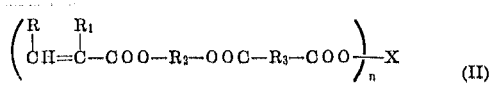 (II)

wherein R and $R_1$ are as defined above, $R_2$ is an alkylene group having carbon atoms of 2 to 10, polyethylene glycol residual group or polypropylene glycol residual group and $R_3$ is

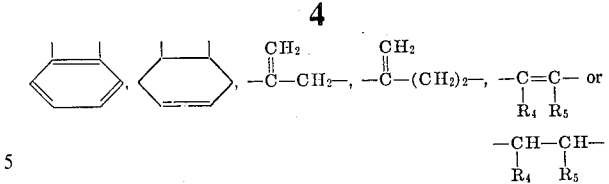

(wherein $R_4$ and $R_5$ represent hydrogen atom or an alkyl group having 1 to 4 carbon atoms), and X and n are as defined above; and

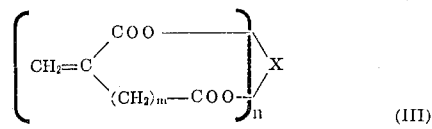 (III)

wherein $m$ is an integer of 2 or 3 and X and n are as defined above.

The composition, containing the metal salts of the unsaturated carboxylic acids as described above in an amount of 2 to 60% by weight based on the resinous composition, may be irradiated by light in the presence of an oxygen containing atmosphere such as air without substantially suffering the polymerization inhibiting effect thereof. Accordingly, when the composition is coated on a substrate and irradiated by light, the film surface obtained is tack free and adhesion thereof to the substrate is also very good. If the metal carboxylate (A) contained in the resinous composition is less than 2% by weight, no resinous composition curable by photo-irradiation in the presence of oxygen according to the present invention can be obtained. On the other hand, if said metal carboxylate (A) is more than 60% by weight, viscosity increase phenomenon is observed during long term storage of the resinous composition and the film produced by curing the resinous composition by photo-irradiation is deteriorated in flexibility.

As the unsaturated compound (B) having from 0.5 to 12, preferably from 3 to 7, polymerizable unsaturated bonds per unit molecular weight of 1000 which is used in the practice of the present invention, various unsaturated compounds such as unsaturated polyesters, unsaturated acrylic resins, etc. may be used. Above all, the unsaturated compounds as specified below as B-1 – B-5 may preferably be used in the present invention for preparation of a resinous composition having excellent properties.

(a) B-1 compound

This compound is a divinyl compound obtained by allowing a polyepoxy compound with epoxy equivalent from 100 to 2000 to react with an unsaturated carboxylic acid at the ratio of one epoxy group per one carboxylic group. As the carboxylic acids, acrylic acid, methacrylic acid, crotonic acid and mono-carboxylic acids represented by the formula (IV) and (V) may be used.

 (IV)

wherein R and $R_1$ are as mentioned above,

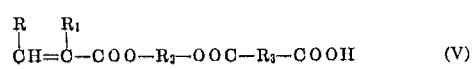 (V)

wherein R, $R_1$, $R_2$ and $R_3$ are as mentioned above.

The polyepoxy compounds with epoxy equivalent from 100 to 2000 are exemplary polyepoxy compounds obtained from the reaction between epichlorohydrin or methyl epichlorohydrin and the compounds having at least two hydroxyl groups such as resorcinol, bisphenol A, 1,1,2,2,-tetrakis (oxyphenyl)ethane, polyethylene glycol, polypropylene glycol, butane diol, glycerine, trimethylol propane, neopentyl glycol, pentaerythritol, and the like, or polyepoxy compounds obtained from the reaction of epichlorohydrin or methyl epichlorohydrin with polyvalent carboxylic acids such as succinic acid, adipic acid, cebacic acid, phthalic acid, trimellitic acid and the like. Furthermore, epoxidized novolak resin, epoxidized oil, epoxidized polybutadiene, triglycidyl isocyanurate may also be mentioned as suitable polyepoxy compounds.

If a polyepoxy compound with epoxy equivalent of less than 100 is used as the starting material and subjected to addition reaction with an unsaturated carboxylic acid, the concentration of unsaturated bonds in the unsaturated resin produced is less than 0.5 per unit molecular weight of 1000. When this unsaturated resin is cured by photo-irradiation, it cannot be utilized for paints or ink binders due to its low crosslinking density. On the other hand, a polyepoxy compound with epoxy equivalent of more than 2000 is used, the concentration of unsaturated bonds in the unsaturated resin obtained is more than 12 per unit molecular weight of 1000. The cured product produced by photo-irradiation of this resin is extremely poor in flexibility as well as in impact strength.

In the preparation of the unsaturated resin as mentioned above, it is required that one equivalent epoxy group contained in the polyepoxy compound should be allowed to react with about one equivalent carboxylic group contained in the unsaturated carboxylic acid.

(b) B-2 compound

This compound is a tetra- or hexa-vinyl ester condensate obtained from the addition reaction between the divinyl ester condensate of (B-1) and a diisocyanate at a ratio of 2:1 to 3:2. For example, this compound is obtained according to the following reaction scheme:

boxylic acids herein used may include succinic acid, adipic acid, cebacic acid, isophthalic acid, terephthalic acid, maleic acid, itaconic acid, α-methylene glutaric acid and the like.

(d) B-4 compound

This compound is obtained by reacting the compound (B-3) as mentioned above with a diisocyanate at a ratio of 2:1 to 3:2. The isocyanates herein used may be those as mentioned in the preparation of the compound (B-2).

The hexavinyl or tetravinyl compound such as the compound (B-2) or (B-4) which is obtained from addition reaction of an unsaturated resin with a diisocyanate at a ratio of 2:1 to 3:2 can be combined with a metal salt of an unsaturated carboxylic acid to give a resinous composition which is further enhanced in curability by irradiation of light under the atmosphere in the presence of oxygen and also in adhesive property of the coated film to substrates as well as flexibility thereof. Hence, the resinous composition containing these compounds is particularly useful for coating materials and ink binders.

(e) B-5 compound

This compound is a di-, tri- or tetra-vinyl compound prepared by condensing polyols with unsaturated carboxylic acids. Namely, polyols having two or more hydroxyl groups per one molecule are allowed to react with unsaturated mono-carboxylic acids or halides thereof at equal molar ratio of said mono-carboxylic acids or halides thereof to the hydroxyl groups.

The polyols to be used for preparation of the unsaturated resin (B-5) may include ethylene glycol, propylene glycol, 1,3-butylene glycol, 1,4-butylene glycol, 1,6-hexane diol, diethylene glycol, triethylene glycol, tetraethylene glycol, pentaethylene glycol, bisphenol A, trimethylol propane, glycerine, pentaerythritol, neopentyl glycol, and the like. As the unsaturated mono-carboxylic acids or halides thereof, acrylic acid, meth-

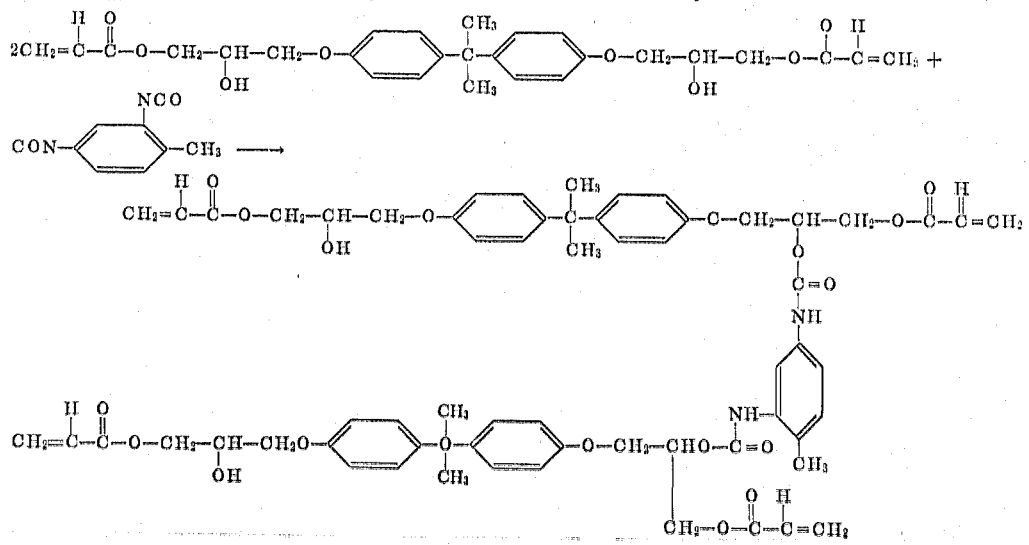

The diisocyanate compounds to be used in the preparation of the unsaturated resin (B-2) may include lysin isocyanate, xylylene diisocyanate, dimeric acid diisocyanate, tolylene diisocyanate, diphenyl methane diisocyanate, biphenylene diisocyanate, and the like.

(c) B-3 compound

This unsaturated resin is obtained by subjecting a dicarboxylic acid with glycidyl acrylate or methacrylate to addition reaction at a molar ratio of 1:2. The dicaracrylic acid, crotonic acid, the carboxylic acids represented by the formula (I), or chlorides or bromides thereof may be used.

As mentioned above, the composition according to the present invention comprises a resinous composition, comprising from 2 to 60% by weight of the di- or trivalent metal salts of the unsaturated carboxylic acid (A) as described above and from 98 to 60% by weight of the unsaturated resin (B) containing from 0.5 to 12 polymerizable unsaturated bonds per unit molecular weight of 1000. If the amount of the unsaturated resin (B) is less than 60% by weight, cured resin produced by photo-irradiation are not only inferior in physical properties such as flexibility or impact strength but also in such chemical properties as water resistance or chemical resistance. On the contrary, if said amount is more than 98% by weight, curing property of the composition is deteriorated when it is irradiated by light under an atmosphere containing oxygen.

The unsaturated resins as specified above which may preferably be used for practice of the present invention may be used alone or in any combination with each other. Furthermore, a small amount of alkyd resins may also be added to the resinous composition. But if alkyd resin is used excessively, curing property of the resinous composition is deteriorated.

As the photo-sensitizers which may be used for practice of the present invention, such carbonyl compounds as benzoin, benzoin methyl ether, benzoin butyl ether, benzoin isopropyl ether, benzophenone and the like may be used. In addition, other compounds such as azobisisobutyronitrile, trimethyl benzyl ammonium chloride, etc. may also be used. These photosensitizers may be used in an amount from 0.1 to 15% by weight based on the weight of the resinous composition as described above.

The resinous composition according to the present invention may further contain, if desired, other vinyl monomers such as methyl acrylate (or methacrylate), ethyl acrylate (or methacrylate), butyl acrylate (or methacrylate), propyl acrylate (or methacrylate), 2-ethyl hexyl acrylate (or methacrylate), cyclohexyl acrylate (or methacrylate), benzyl methacrylate, phenetyl methacrylate, vinyl acetate, vinyl propionate, styrene, and the like.

Particularly, for improvement of coating processability of the resinous composition on substrates, such oils as tung oil, soybean oil, linseed oil, castor oil, dehydrated castor oil, etc. may also be added to the composition. These oils may be added during the procedure of preparation of the unsaturated resin (B) or at the time of mixing of the unsaturated resin (B) with the polyvalent metal salts of the unsaturated carboxylic acids (A).

The resinous composition according to the present invention may be cured by irradiation of a light having wavelength in the range from 200 to 600 m$\mu$. As the light source, low pressure, high pressure or super-high pressure mercury lamp, carbon arc lamp, xenon short arc lamp, xenon pulse lamp, etc. may be used. Curing conditions are determined depending on various factors such as the polyvalent salts of the unsaturated carboxylic acids and the photo-sensitizers contained in the composition; amounts thereof; the light source employed; the distance from the light source to the irradiated object; the desired crosslinking density to be attained of the irradiated object; etc. For example, when the thickness of the irradiated object is 30 $\mu$, the distance from the light source to the irradiated object is 10 cm and 500 W high pressure mercury lamp is used as the light source, the irradiation time is about from 1 to 5 minutes.

The resinous composition of the present invention may be used as a clear product. But it may also be used in preparing enamels by being admixed with dyes or pigments which are difficulty faded by irradiation of light, for example, Indian fast yellow, Indian fast scarlet, cadmium red, cadmium yellow, graphite, black iron oxide, titanic oxide, strontium oxide, barium sulfate, Malachite green, Alizarine red, etc.

The hardened product obtained by photo-irradiation of the resinous composition according to the present invention shows good adhesive property toward substrates and also exhibits excellent properties such as flexibility, chemical resistance, mechanical strength and so forth. Therefore, the resinous composition according to the present invention may favorably be used for coating, ink binders or other adhesives. Furthermore, the resinous composition of the present invention may be admixed with foaming agents, and after being irradiated by light, subjected to heat treatment, whereby a foamed coating is produced. Thus, it may be utilized as a coating agent for simulated leather when woven cloth is used as a substrate. The most important feature of the resinous composition is that it can produce tack free cured products when irradiated by light in an atmosphere containing oxygen without polymerization inhibiting effect, from which the conventional resinous composition have suffered. Accordingly, it can be utilized widely in various industrial applications.

The present invention will further be illustrated by referring to the following Examples, wherein "parts" and "%" signify "parts by weight" and "% by weight", respectively.

EXAMPLE 1

One hundred and sixteen parts of 2-hydroxyethyl acrylate, 148 parts of phthalic acid anhydride, 3 parts of dimethylaminoethyl methacrylate and 0.3 part of hydroquinone mono-methyl ether were charged into a flask equipped with a stirrer. The reaction was conducted for 1 hour, while maintaining the temperature at 95°C. Substantially all of the hydroxyl groups were converted to carboxyl groups by this reaction. Then, 190 parts of Epikote No. 823 (trade name: product of Shell Chem. Co., England) were added to the reaction mixture and the reaction was continued for 6 hours at 95°C. As the result of this reaction, 90% of carboxyl groups reacted with epoxy groups to produce an oligomer having vinyl groups at terminal ends (2 terminal vinyl groups per unit molecular weight of 1000). This was confirmed by infra-red spectroscopic analysis and measurement of the acid value.

One hundred parts of the thus prepared oligomer, 60 parts of 50% zinc acrylate solution in isopropyl alcohol, 20 parts of 2-hydroxyethyl acrylate, 5 parts of benzoyl butyl ether and 40 parts of an insoluble azo pigment (Brilliant Carmin FB: trade name, product of Sanyo Shikiso. Co., Japan) were blended together to prepare an ink.

By the use of this ink off set printing was effected on an aluminum plate. The thickness of film of ink was about 7 $\mu$. A ultra-violet irradiation apparatus was used, wherein two high pressure mercury lamps with an input 200W/inch were arranged rectangular to moving direction of conveyer and set at a distance of 15 cm from the conveyer moving at a speed of 15 m/minute. When the above printed plate was placed on said conveyer and irradiated by ultra-violet rays, ink was completely cured.

EXAMPLE 2

Ninty four parts of hydroxyethyl methyl itaconate, 5 parts of dimethylamino ethyl methacrylate and 0.1 part of hydroquinone monomethyl ether were mixed and allowed to react at 90°C for 2 hours. Then 55 parts of diethylene glycol diglycidylether were added to the reaction mixture and the reaction was carried out at 90°C for 5 hours to obtain an oligomer having vinyl groups at terminal ends (3,5 terminal vinyl groups per unit molecular weight of 1000).

One hundred parts of this oligomer, 50 parts of 50% aluminum triacrylate solution in methyl alcohol, 50 parts of pentaerythritol triacrylate, 10 parts of benzoin methyl ether and 100 parts of cadmium yellow were blended to prepare an ink.

By the use of this ink, printing was carried out on a polyvinyl chloride sheet. The printed sheet was irradiated by ultra-violet rays by using the same apparatus as used in Example 1, but at a conveyer speed of 20 m/minute, whereby ink was hardened and the printed surface obtained was entirely resistant to acetone.

EXAMPLE 3

A resinous composition comprising 100 parts of the oligomer obtained in Example 1, 40 parts of 50% zinc diacrylate solution in methyl alcohol, 30 parts of neopentyl glycol diacrylate, 20 parts of tripentaerythritol octaacrylate and 5 parts of benzoin isopropyl ether was admixed with 20 parts of strontium oxide, 15 parts of barium sulfate and 15 parts of Marachite green to prepare an ink.

This ink was provided for printing a tin plate. The printed plate was subjected to irradiation by the same irradiation apparatus as used in Example 1, but at a conveyor speed of 20 m/minute, whereby the ink was cured and felt dry by touch of fingers.

This plate was further coated, 30 $\mu$ thick, with the above resinous composition, but containing no coloring agents, and irradiated by ultra-violet rays in a similar manner at a conveyer speed of 10 m/minute. The coated film was cured completely to produce a print processed plate useful as can material which is excellent in hardness, flexibility, solvent resistance and acid resistance.

EXAMPLE 4

One hundred parts of the oligomer obtained in Example 2, 50 parts of 50% calcium diacrylate solution in methyl alcohol, 50 parts of pentaerythritol triacrylate, 10 parts of benzoin methyl ether and 100 parts of cadmium yellow were blended to prepare an ink.

This ink was used for printing a polyvinyl chloride sheet. The printed sheet was travelled at a conveyer speed of 20 m/minutes under the ultra-violet lamps by the use of the same ultra-violet irradiation apparatus as used in Example 1 to effect irradiation thereupon, whereby ink was cured.

EXAMPLE 5

A coating composition comprising 150 parts of 40% zinc acrylate solution in isopropyl alcohol, 100 parts of acrylic acid addition product of glycerine diglycidylether and 50 parts of 2-hydroxyethyl methacrylate was coated, 30 $\mu$ thick, on a polished soft steel plate and irradiated in the air by ultra-violet rays by being passed under the same ultra-violet lamp as used in Example 1 at a conveyer speed of 10 m/minute. The coated film was thereby completely cured and had excellent adhesive property and solvent resistance as shown in Table 1.

COMPARATIVE EXAMPLE 1

Example 5 was repeated but no zinc acrylate was used.

The cured film obtained was slightly tacky and had the properties as shown in Table 1, which were considerably inferior in adhesive property and solvent resistance as compared with the film obtained in Example 5.

These results show that the coating composition according to the present invention is hardly influenced by the polymerization inhibiting effect of oxygen and the cured film obtained therefrom exhibits excellent film properties.

Table 1

| Film properties | Example 5 | Comparative Example 1 |
|---|---|---|
| State of the surface of hardened coated film | tack free | slightly tacky |
| Hardness of surface (pencil hardness) | 2 H | 2 B |
| Adhesiveness test by Checkers *1) | 100 | 55 |
| Solvent resistance test *2) | more than 100 times | 20 |

*1) 100 checkers (2mm × 2mm) sectioned with a knife on the film surface are peeled off with an adhesive cellophane tape; the number of checkers remained is reckoned as a measure showing adhesive strength.
*2) The film surface was rubbed with xylene immersed gauze until the substrate is exposed; the values show the times of rubbing.

EXAMPLE 6

One hundred parts of a resinous composition comprising 90 parts of 35% aluminum methacrylate solution in methanol, 180 parts of tetraethylene glycol dimethacrylate and 30 parts of n-butyl acrylate were blended with 70 parts of titanic oxide to prepare a coating composition.

Said coating composition was coated, 40 $\mu$ thick, on an aluminum plate, and irradiated by ultra-violet rays under the same conditions as in Example 1. The coated film was completely cured and exhibited excellent adhesive property.

EXAMPLE 7

To 100 parts of a resinous composition, comprising 120 parts of 40% zinc methacrylate solution in isopropyl alcohol, 80 parts of 2-hydroxyethyl acrylate, 30 parts of ethyl acrylate and 10 parts of epoxy resin (Epikote No. 1001:trade name, product of Shell Chem. Co., England) were added 2 parts of benzoin methyl to prepare a coating composition.

Said coating composition was coated, 50 $\mu$ thick, on a ply wood on which was applied a printing of a wood pattern. Ultra-violet ray was irradiated for two minutes on this coating by means of a high pressure mercury lamp of 800 W from a distance of 10 cm, whereby the coated film was completely cured and exhibited excellent adhesive property as well as solvent resistance.

EXAMPLE 8

A coating composition was obtained according to the same procedure as described in Example 6 except that 100 parts of 40% calcium acrylate solution in ethanol were used in place of aluminum methacrylate.

Said coating composition was coated, 10 $\mu$ thick, on a zinc plated steel plate and irradiated by ultra-violet light under the same conditions as described in Example 5, whereby the coated film was completely cured and exhibited excellent adhesive property.

EXAMPLE 9

One hundred and thirty parts of 2-hydroxyethyl methacrylate, 100 parts of succinic acid anhydride, 2 parts of dimethylamino ethyl methacrylate and 0.3 part of hydroquinone mono-methyl ether were mixed together. The mixture was elevated to the temperature of 95°C and maintained at said temperature for 1 hour, whereby a mixture of the unsaturated mono-carboxylic acid having the structure of the following formula with dimethylamino ethyl methacrylate was obtained.

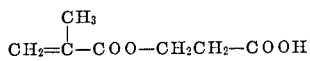

The above mixture was allowed to react with 140 parts of diglycidyl hexahydrophthalate at 95°C for 6 hours. From the measurement of the concentrations of carboxylic acid group and epoxy group contained in the reaction product, it was confirmed that a resinous composition containing an unsaturated resin, obtained by the reaction of about 90% glycidiyl groups with the aforesaid unsaturated carboxylic acids, was produced.

A clear paint (1) was prepared by admixing 100 parts of this resinous composition with 10 parts of zinc diacrylate solution in methyl methacrylate, 30 parts of buthoxy ethyl acrylate and 2 parts of benzoin isobutyl ether. Another clear paint (2) was also prepared from the mixture of 100 parts of said resinous composition, 30 parts of buthoxy ethyl acrylate and 2 parts of benzoin isobutyl ether. These clear paints were coated respectively, to a film thickness of 50 μ, on ply woods which were treated to grainless and printed in wood pattern to prepare two coated plates. Each coated plate was carried on a conveyer at a speed of 10 m/minute and irradiated by ultra-violet rays similarly as in Example 1 to prepare a ply wood having cured coated film thereon. Solvent resistance, adhesive property of the coated film to substrate, pencil hardness and impact strength of the coated film was measured in the manner as described in Table 1 to give the results as shown in Table 2 below.

Table 2

|  | Pencil hardness | Adhesive property | Solvent resistance |
|---|---|---|---|
| Paint (1) | H to 2H | 100/100 | more than 100 times |
| Paint (2) | F to H | 0/100 | 35 times |

EXAMPLE 10

One hundred and ninty parts of a diepoxy compound prepared by addition reaction of bisphenol A with epichlorohydrin (Epikote No. 828:trade name, product of Shell Chem. Co., England), 27 parts of acrylic acid, dimethylamino ethyl methacrylate and 0.5 part of hydroquinone mono-methyl ether were mixed together and heated at 95°C for 7 hours to obtain a resinous composition containing the unsaturated resin having the following formula.

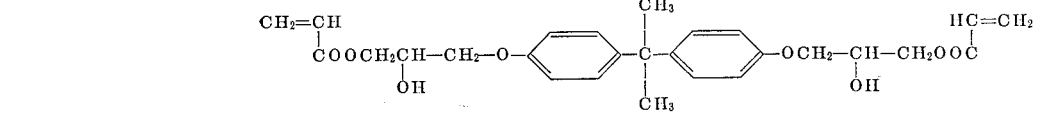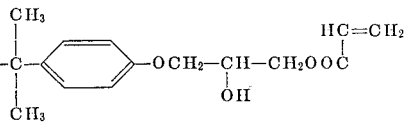

One hundred and thirty parts of the unsaturated resin as prepared above were mixed with 100 parts of n-butyl acrylate. The mixture was heated to 60°C and 36 parts of tolylene diisocyanate were added thereto by titration method over one hour, whereby the unsaturated resin and tolylene diisocyanate were converted through addition reaction to a resinous composition containing a hexavinyl compound.

To 100 parts of the thus prepared resinous composition were added 2 parts of benzoin methyl ether and 60% zinc acrylate solution in isopropyl alcohol. The mixture was coated on a ply wood printed in wood pattern to a thickness of 15 μ. The coated film was cured by irradiation of light from 800 W high pressure mercury lamp placed at a distance of 10 cm therefrom, which was continued for 3 minutes. The coated film obtained was tack free and had excellent adhesive property to the substrate as well as excellent flexibility.

EXAMPLE 11

One hundred and forty-six parts of adipic acid, 142 parts of glycidyl methacrylate, 5 parts of dimethylamino ethyl methacrylate and 0.5 part of hydroquinone mono-methyl ether were mixed together and the reaction was conducted at 95°C for 7 hours. A resinous composition containing the unsaturated resin having the following formula.

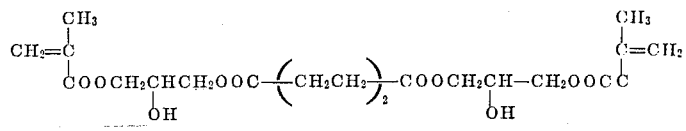

Seventy parts of the unsaturated resin prepared by the method as described above were mixed with 100 parts of butyl acrylate. The mixture was then heated to 60°C and 36 parts of tolylene diisocyanate were titrated thereto over one hour to effect addition reaction between the aforesaid unsaturated resin and tolylene diisocyanate to obtain a resinous composition containing a hexavinyl compound.

The resinous composition obtained was admixed with a photo-sensitizer, coated and cured similarly as described in Example 10 to obtain a coated film having excellent physical properties.

EXAMPLE 12

Example 10 was repeated except that 1-epoxy ethyl-3,4-epoxy cyclohexane was used in place of the condensate of bisphenol A and epichlorohydrin.

EXAMPLE 13

Example 11 was repeated except that 130 parts of itaconic acid were used in place of 146 parts of adipic acid.

EXAMPLE 14

Example 10 was repeated except that hexamethylene diisocyanate was used in place of tolylene diisocyanate.

EXAMPLE 15

Example 11 was repeated except that hexamethylene diisocyanate was used in place of tolylene diisocyanate.

EXAMPLE 16

Example 11 was repeated except that acrylic acid was used place of methacrylic acid.

EXAMPLE 17

Example 1 was repeated except that tetra-hydro phthalic acid anhydride was used in place of phthalic acid anhydride.

EXAMPLE 18

Example 17 was repeated except that itaconic acid anhydride was used in place of tetra-hydro phthalic acid anhydride.

EXAMPLE 19

Example 17 was repeated except that α-methylene gultaric acid anhydride was used in place of tetra-hydro phthalic acid anhydride.

We claim:

1. A resinous composition curable by photo-irradiation which comprises:

A. At least one divalent or trivalent metal salt of unsaturated mono- or di-carboxylic acids selected from the group consisting of

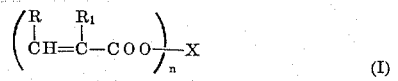  (I)

wherein R and $R_1$ are hydrogen or methyl; X is a divalent or trivalent metal atom and n is an integer of 2 or 3,

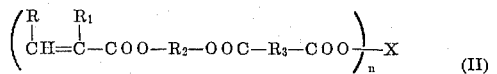  (II)

wherein R and $R_1$ are defined as above, $R_2$ is an alkylene group having 2 to 10 carbon atoms, polyethylene glycol residual group or polypropylene glycol residual group, and $R_3$ is

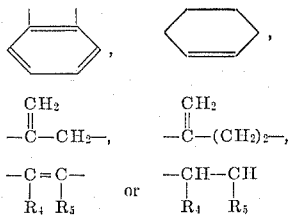

wherein $R_4$ and $R_5$ represent hydrogen or alkyl having 1 to 4 carbon atoms, and X and n are as defined above; and

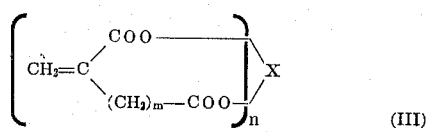  (III)

wherein m is an integer of 2 or 3 and X and n are as defined above,

B. At least one unsaturated compound having 0.5 to 12 polymerizable unsaturated bonds per unit molecular weight of 1000, being selected from the group consisting of 1. A divinyl reaction product of a polyepoxy having an epoxy equivalent of 100 to 2000, and an unsaturated monocarboxylic acid, in a ratio of one epoxy group per one carboxylic acid group,
   2. A tetra or hexa vinyl ester condensate reaction product of said divinyl product (1) above, and a diisocyanate in a ratio of 2:1 to 3:2,
   3. AN unsaturated resin reaction product of dicarboxylic acid and glycidyl acrylate or methacrylate in a molar ratio of 1:2,
   4. Reaction product of (3) above with a diisocyanate in a ratio of 2:1 to 3:2,
   5. Di, -tri, or tetra-vinyl condensation reaction product of a polyol and an unsaturated carboxylic acid and halide thereof in an equivalent ratio, and C. At least one photosensitizer wherein the quantity of (A) and (B) is from 2 to 60% by weight and from 98 to 40% by weight, respectively based on the total weight of (A) and (B), and wherein the photosensitizer is used in an amount of 0.1 to 15% by weight, based on the weight of the resinous composition.

2. The resinous composition according to claim 1 wherein the divalent or trivalent metal is selected from the group consisting of magnesium, calcium, barium, zinc, aluminum, ferrous iron, and ferric iron.

3. The resinous composition according to claim 1 wherein (B) is a product obtained by allowing an unsaturated mono-carboxylic acid of the formula:

  (IV)

wherein R and $R_1$ are as defined above, or

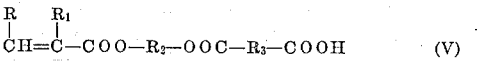  (V)

wherein R, $R_1$, $R_2$ and $R_3$ are as defined above, with a polyepoxy resin with epoxy equivalent of 100 to 2000.

4. The resinous composition according to claim 1 wherein (B) is a tetra- or hexa-vinyl compound prepared by allowing the divinyl compound which is obtained from the reaction between the unsaturated carboxylic acid represented by the formula (IV) or (V) and a polyepoxy compound with epoxy equivalent of 100 to 2000 to react with a diisocyanate compound at a ratio of 2:1 to 3:2.

5. The resinous composition according to claim 1 wherein (B) is a divinyl compound obtained by allowing a dicarboxylic acid with glycidyl acrylate or methacrylate at a molar ratio of 1:2.

6. The resinous composition according to claim 1 wherein (B) is a tetra- or hexa-vinyl compound prepared by reacting the divinyl compound, which is obtained by allowing a dicarboxylic acid with glycidyl acrylate or methacrylate at a molar ratio of 1:2, to react with a diisocyanate compound at a ratio of 2:1 to 3:2.

7. The resinous composition according to claim 1 wherein (B) is a di-, tri- or tetra-vinyl compound obtained by allowing a polyol having from 2 to 4 hydroxyl groups with unsaturated mono-carboxylic acid represented by the formula (IV) or (V) as defined in claim 4, or halide thereof at equivalent ratio of hydroxyl groups in said polyol to carboxylic acid or halocarboxylic acid groups in said mono-carboxylic acid or halide thereof.

* * * * *